(12) United States Patent
Mickievicz

(10) Patent No.: US 6,953,285 B2
(45) Date of Patent: Oct. 11, 2005

(54) ANTI-BACKOUT LATCH FOR FIBER OPTIC CONNECTOR

(75) Inventor: Scott Keith Mickievicz, Elizabethtown, PA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 175 days.

(21) Appl. No.: 10/262,719

(22) Filed: Oct. 1, 2002

(65) Prior Publication Data

US 2004/0062487 A1 Apr. 1, 2004

(51) Int. Cl.[7] .............................................. G02B 6/38
(52) U.S. Cl. ............................. 385/56; 385/88; 385/53
(58) Field of Search .......................................... 385/56

(56) References Cited

U.S. PATENT DOCUMENTS

| | | | |
|---|---|---|---|
| 5,828,804 A * | 10/1998 | Akins et al. | 385/58 |
| 6,186,670 B1 * | 2/2001 | Austin et al. | 385/55 |
| 6,267,513 B1 * | 7/2001 | Seto et al. | 385/56 |
| 6,644,868 B2 * | 11/2003 | De Marchi | 385/88 |

* cited by examiner

Primary Examiner—John R. Lee
Assistant Examiner—Phillip A. Johnston
(74) Attorney, Agent, or Firm—Peter Van Winkle

(57) ABSTRACT

An optical fiber connector (14) is provided, of a type that has a housing (70) and a fiber block (72) slideable between forward and rearward positions within a passage of the housing, the housing having guide-receiving spaces (120, 122) on opposite sides of the passage for receiving guides (60) of a mating connector device, which assures that the block will remain in its forward position prior to mating of the connector with the connector device. A sheet metal retainer (110) for retaining the fiber block in the forward position, includes a latch (112) that lies in the path of rearward movement of a shoulder (118) on the fiber block as the fiber block moves rearwardly from its forward position, to resist such movement with a force of a plurality of pounds. The retainer has lifters (130, 132) that project into the guide-receiving spaces, so as the guides move rearwardly along the spaces they lift the lifters which lift the latch to facilitate rearward movement of the fiber block during mating of the connector and connector device.

6 Claims, 4 Drawing Sheets

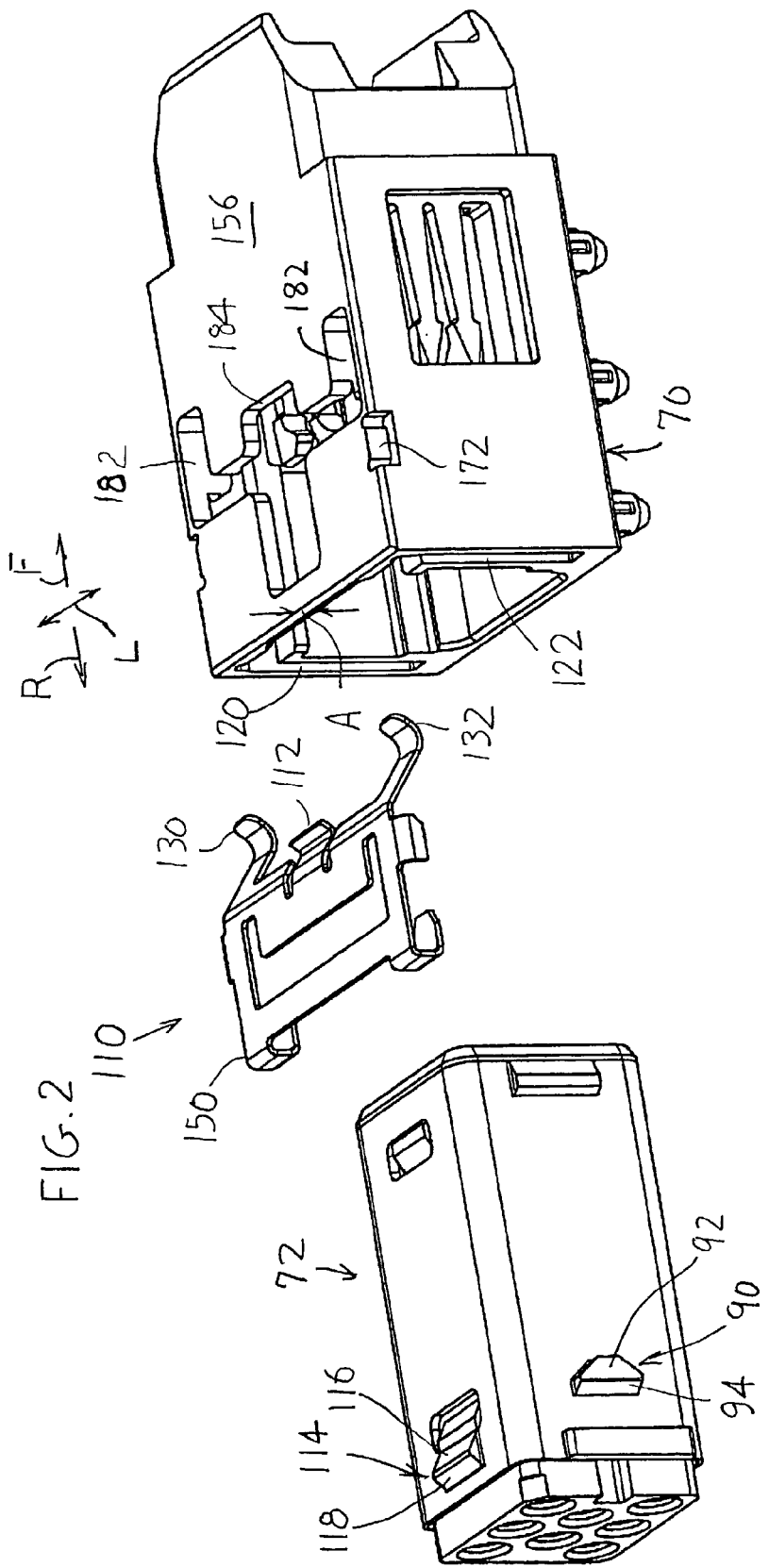

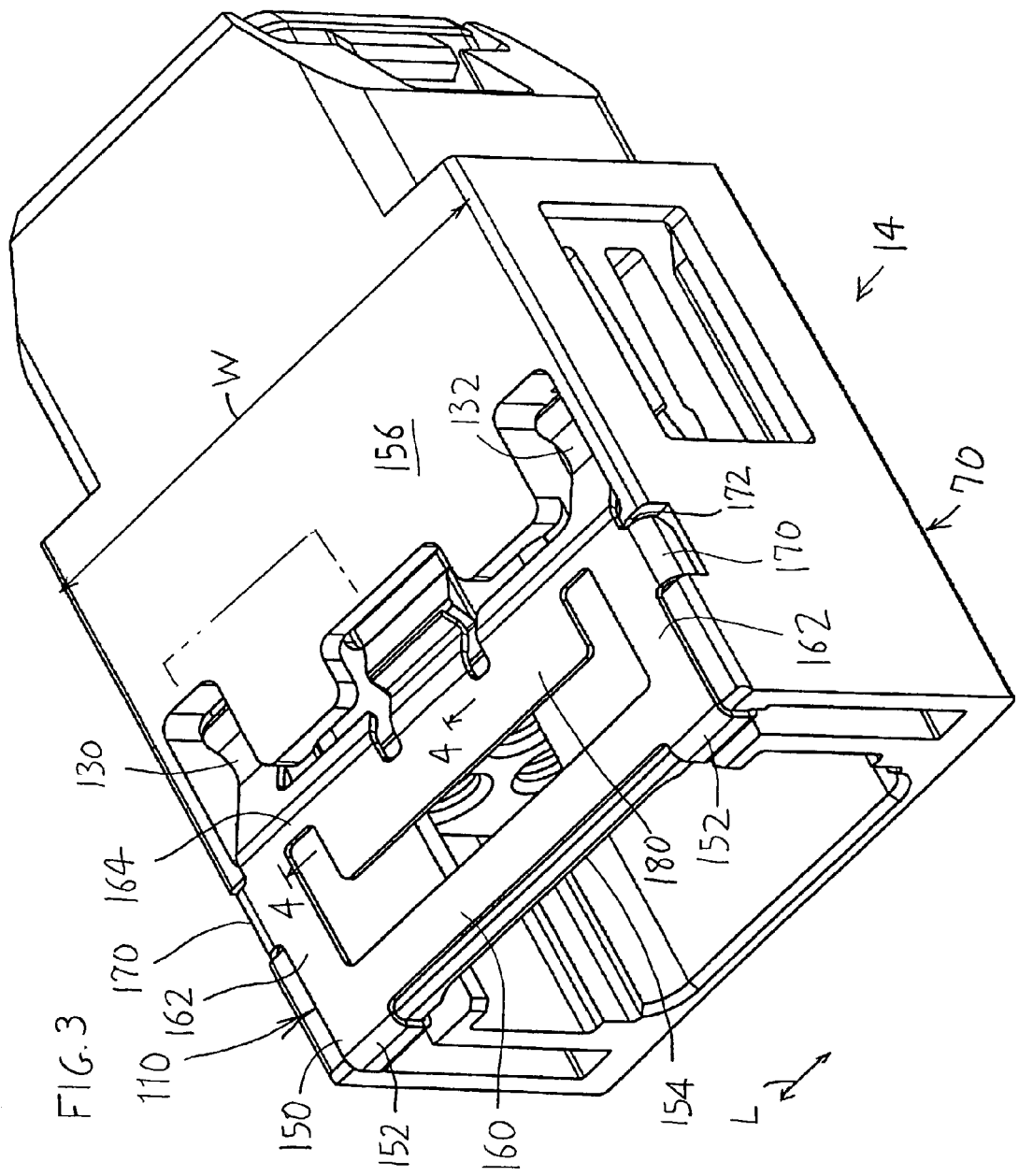

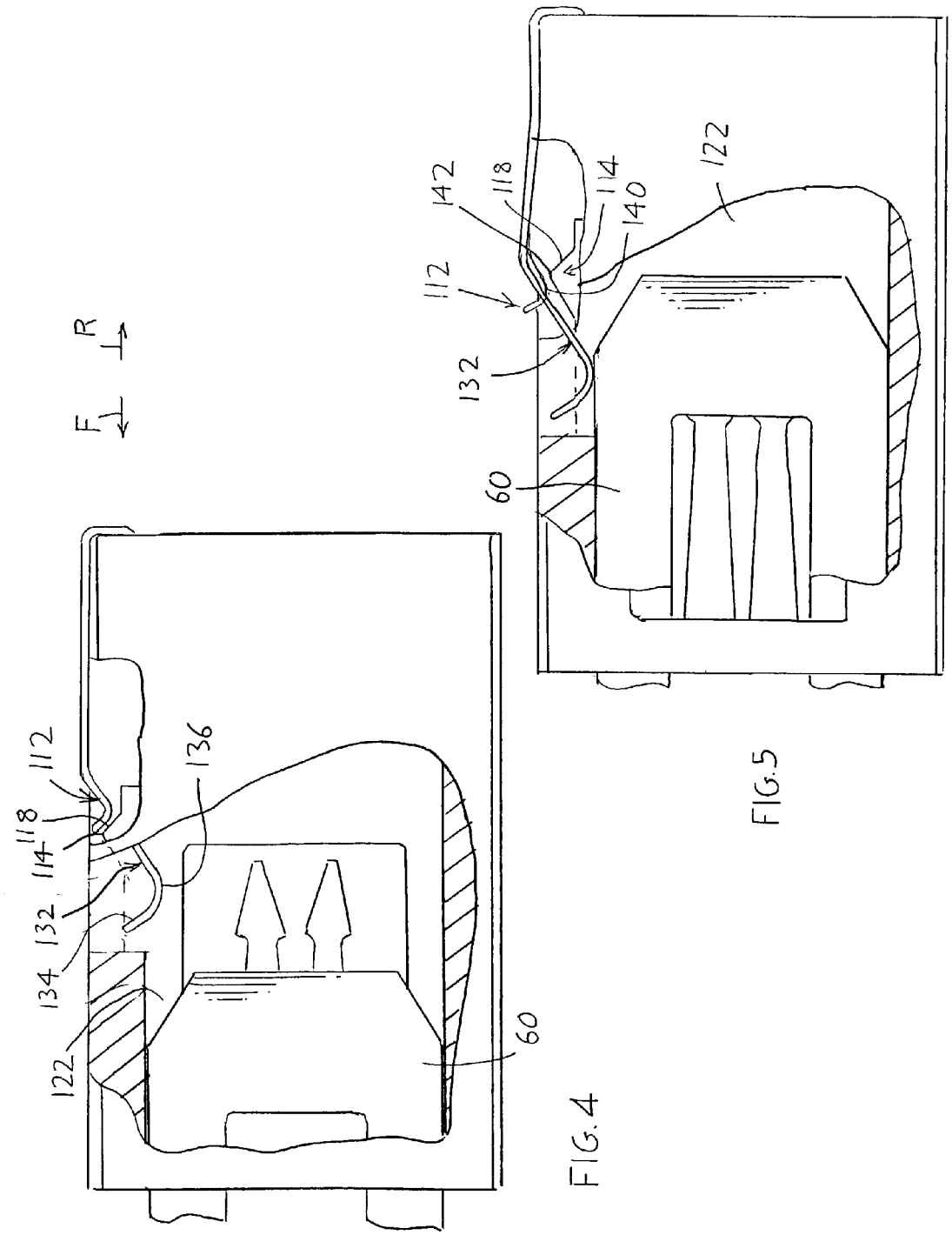

ANTI-BACKOUT LATCH FOR FIBER OPTIC CONNECTOR

BACKGROUND OF THE INVENTION

One type of optical fiber connector system includes a connector with a fiber block and a mating connector device with a corresponding fiber block device. When the connector is moved forwardly into the housing of the connector device, tips of fiber-holding ferrules on the fiber block and fiber block device abut so corresponding pairs of fibers are connected together. In order to mate the connector and connector device, the fiber block must lie in a forward position. During mating, the fiber block is moved rearwardly to a rearward position. When the connector and connector device are pulled apart, the fiber block is automatically pulled forwardly and tends to remain in the forward position wherein it is ready for another mating.

In order to retain the fiber block in its forward and rearward positions, the fiber block is provided with a cam follower that moves across corresponding cams formed on the housing, with a force such as 8 ounces required to deflect the cams. A force of about 8 ounces required to move the fiber block to its rearward position, facilitates mating of the connector and connector device. However, such a low force can result in the fiber block accidentally moving to its rearward position during handling. It would be desirable if the fiber block could be retained in its forward position during handling, but could still be easily moved to its rearward position during mating with the connector device.

SUMMARY OF THE INVENTION

In accordance with one embodiment of the present invention, an optical fiber connector is provided, of a type that includes a connector housing and a fiber block that can move between forward and rearward positions in the housing. The connector more securely retains the fiber block in its forward position prior to mating with a mating connector that has guides, and facilitates movement of the fiber block to its rearward position during mating. The connector includes a sheet metal retainer that includes a latch that lies in the path of rearward movement of a shoulder on the fiber block, to resist rearward movement of the fiber block. The retainer also includes a pair of lifters each lying in one of a pair of guide-receiving spacers at opposite sides of the housing. The lifters are connected to the latch and both can be raised by bending of spring arms that extend to a mount that mounts on the housing. During mating, the guides move into and rearwardly along the guide-receiving spaces. During such movement, the guides lift the lifters, and the lifters lift the latch and release the fiber block to move rearwardly under a low force.

The novel features of the invention are set forth with particularity in the appended claims. The invention will be best understood from the following description when read in conjunction with the accompanying drawings.

BRIEF DESCRIPTION OF THE DRAWINGS

FIG. 2 is an exploded isometric view of the connector of FIG. 1.

FIG. 3 is an assembled isometric view of the connector of FIG. 2.

FIG. 4 is a partial sectional view taken on line 4—4 of FIG. 3, showing the latch and also showing one of the lifters of the retainer, the guide being shown inserted only a small distance into a space of the connector and the latch being shown holding the fiber block in its forward position.

FIG. 5 a view similar to FIG. 4, but with the guide slid further rearward, the lifter shown lifted by the guide, and the latch shown lifted and the fiber block shown in its rearward position.

DESCRIPTION OF THE PREFERRED EMBODIMENTS

Figure 1:
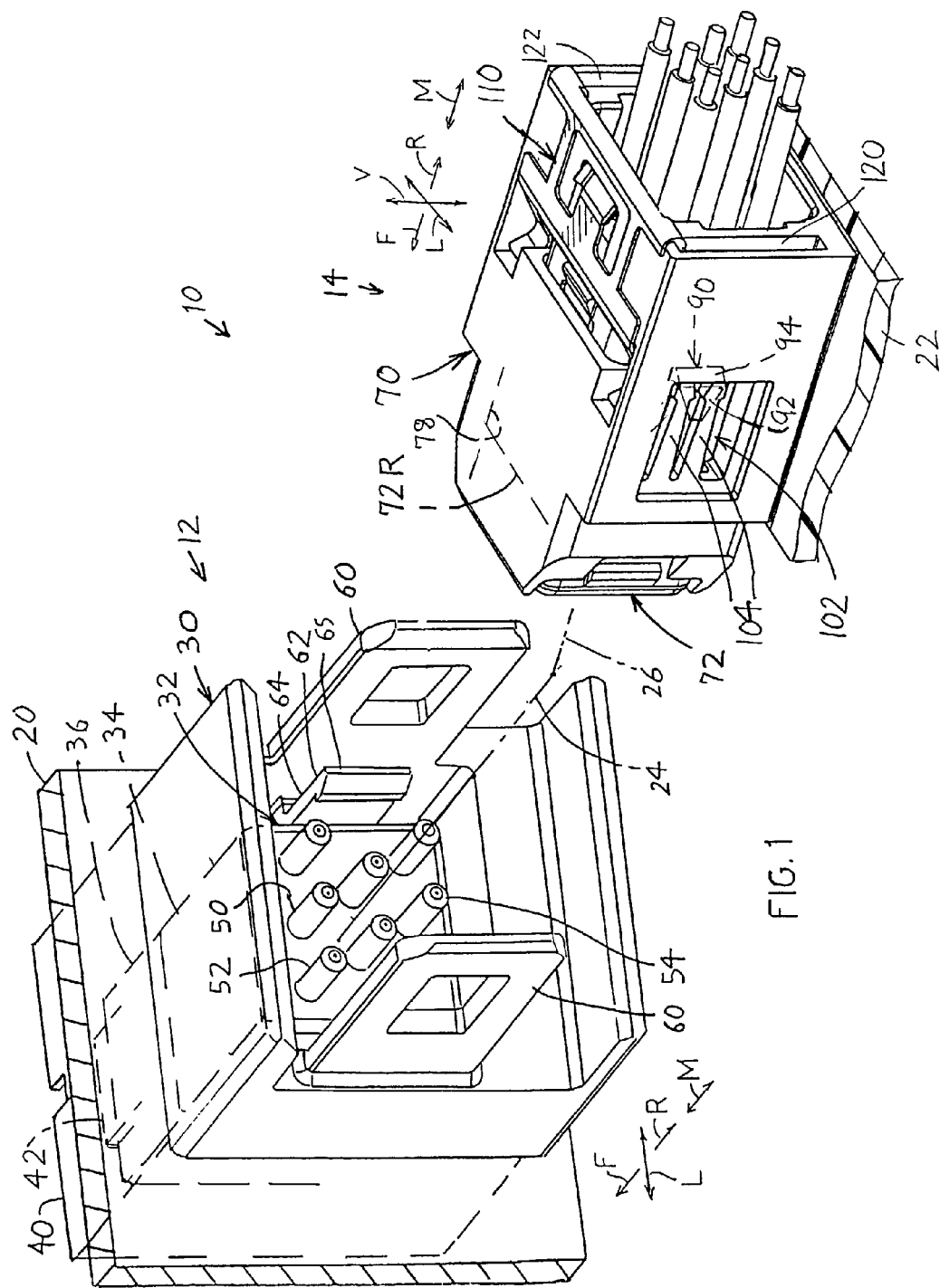
FIG. 1 is an exploded isometric view of an optical fiber connector system of the present invention, with a mating connector device mounted on a mother board and a connector mounted on a daughter board.

FIG. 1 illustrates an optical fiber connector system 10 of the present invention, which includes a mating connector device 12 and another connector 14. Each connector is shown mounted on a circuit board 20, 22. The connector device 12 includes a device housing 30 and a fiber block device 32. The block device 32 holds a plurality of optical termini 50 which include ferrules 52 with tips 54 where the tips of optical fibers are located. The ferrules project rearwardly R from the fiber block device 32. The housing device 30 has a pair of guides 60 at its laterally L opposite sides, and has first housing latches 62 at its laterally opposite sides. The latches 62 include longitudinally M elongated arms 64 that allow the free rear ends 65 of the latches to deflect.

The connector 14 includes a housing 70 and a fiber block 72. The fiber block is slideable in forward F and rearward R directions within a passage 78 of the housing. The rearward position of the fiber block is indicated at 72R while its forward position is shown in solid lines in FIG. 1. The fiber block 72 has a pair of cams 90 at its opposite sides, each cam having front and rear surfaces 92, 94. The housing 70 has a set of cam followers 102 on each side. Each cam follower includes a pair of resilient arms 104. When the fiber block 72 moves forwardly, the front surface 92 of the cam 90 spreads the arms 104 apart to allow the cam to pass. When the fiber block moves rearwardly, the rear surface 94 of the cam deflects the arms 104 laterally L outwardly to allow the cam to pass.

Only a relatively small force such as 8 ounces applied to the fiber block 72, is required to move the fiber block to its rearward position 72R. This is partly due to the limited strength of the plastic molded arms 104. Also, a relatively small rearward force is desirable to move the fiber block to its rearward position during mating of the connectors, to reduce the force required for mating. The fiber block must be in its forward position 72 during mating in order to obtain a successful mating. A problem encountered in practice, is that the block 72 is sometimes moved rearwardly to its rearward position during handling (prior to mating). With the block in its rearward position, the connector 14 cannot mate to the other connector device. Technicians trying to mate the connectors often do not realize this, and it may take considerable time before they realize that the reason the connectors cannot mate is because the fiber block 72 is in its rearward position. It would be desirable if the fiber block were retained in its forward position at 72 so that it required a much higher force such as over one pound and preferably a plurality of pounds, in order to move the fiber block rearwardly during handling. It would also be desirable if, although a large force is required to move the block rearward during handling prior to mating, a much lower force is required to move the block rearwardly during mating.

In accordance with the present invention, applicant provides a retainer 110 which initially retains the block in its forward position 72 against considerable force, but which allows the block to be moved rearwardly to its rearward position 72R with only a low force during mating of the connectors 12, 14. As shown in FIG. 2, the retainer 110 includes a latch 112 that serves to retain the fiber block 72 in its forward position. The fiber block 72 includes a top cam or projection 114 with forward and rearward surfaces, or shoulders 116, 118. When the fiber block 72 begins to move in the rearward direction R, its rearward surface 118 encounters the latch 112 which resist further rearward movement of the fiber block. When the fiber block 72 moves forwardly from its rearward position to its forward position, which occurs during unmating of the connectors, the projection front surface 116 slides forwardly under the latch 112, there being only a modest resistance to such forward movement of the fiber block.

The guide-receiving spaces 120, 122 receive the guides 60 of the mating connector device during mating of the connectors. Applicant uses the guides to lift the latch 112 by forming the retainer 110 with a pair of lifters 130, 132 at laterally opposite sides of the front end of the retainer. As shown in FIG. 4, each lifter such as 132 has a free front end 134 which is bent to form a convex lower surface 136. The convex surface 136 projects into a corresponding guide-receiving space 122. Before the guide 60 is inserted into the space 122 and during initial insertion as shown in FIG. 4, the lifter 134 is in its downward position, and the latch 112 is in its downward position, wherein it is in the path of rearward movement of the rear surface 118 of the fiber block top projection 114.

FIG. 5 shows the guide 60 moved to a more rearward position within the space 122, wherein the guide has lifted the lifter 132. The latch 112 is coupled to the lifter 132, so when the lifter 132 is lifted, it also lifts the latch 112. The bottom 140 of the latch lies close to the top 142 of the top projection 114. As a result, it requires only a small force, if any, for the projection 114 to pass by the latch 112.

FIG. 3 shows that the retainer includes a rear mount end 150 that is mounted on the connector housing 70. The particular retainer mount includes a pair of tabs 152 that are bent around a rear edge 154 of a top plate 156 of the housing. The rear mount end also includes a rear strip 160 that connects the tabs 152 together.

The retainer includes a pair of spring arms 162 at a laterally opposite sides of the connector. The spring arms connect the rear strip 160 to a front strip 164 that lies forward of the rear strip. The lifters 130, 132 and latch 112 are all part of the front strip 164. Accordingly, upward deflection of the lifters 130, 132 results in upward deflection of the latch 112. Such upward deflection of the lifters and latch occurs by resilient bending of the spring arms 162.

The retainer 110 also includes a pair of tabs 170 at laterally opposite sides of the spring arms or of the front strip 164. The tabs 170 lie closely adjacent to opposite side walls 172 of the housing 70, and serve to limit sideward movement of the front strip 164. The retainer 110 also has a retention tab 180 that extends rearward from the front strip 164. The retention tab 180 bears against the top plate 156 of the housing 70, and serves to stabilize the position of the front strip 164.

As shown in FIG. 2, the top plate 156 of the housing includes a pair of openings 182 leading into the guide-receiving spaces 120, 122, and an opening at 184 that leads to the center of the fiber block to enable the latch to engage the top projection 114 of the fiber block. In the connector of FIG. 2, the openings are connected.

It would be possible to form the rear surface 118 of the top projection 114 on the fiber block so it extends vertically, and to form the latch 112 so its extreme front edge abuts such surface. This would prevent rearward movement of the fiber block 72 except by the guide lifting the lifters 130. Otherwise, such a large rearward force would have to be applied to the fiber block that it either bent the latch 112 or cause breakaway of the top projection 114. Applicant prefers to form the latch 112 so it has its convex lower surface 140 that deflects out of the way when a considerable force such as five pounds is applied to move the fiber block rearwardly. This allows a technician to move the shuttle backward even when not mating, in case the technician wished to see how the connector is operating.

Applicant has constructed and tested a retainer of the type illustrated. The retainer was formed of stainless steel of a thickness of 0.009 inch. The housing itself had a width W (FIG. 3) of 0.70 inch and a top wall thickness A (FIG. 2) of 0.03 inch. The other dimensions are relative to the dimensions A and W as is shown in FIG. 3. Although the housing 70 was formed of high strength polymer, the stainless steel of the retainer has a much higher strength. While the force required to move the fiber block rearwardly without the retainer 110 was six ounces, the force required to move the fiber block rearwardly with retainer 110 in place (but not during mating of connectors) was five pounds. During mating, the force required to move the block backward was less than one pound, and there was only a slight increase in mating force required to lift the lifters 130, 132.

While terms such as "top", "upward", etc. have been used to describe the parts as illustrated, it should be noted that the connector and retainer can lie in any orientation with respect to the Earth.

Thus, the invention provides an optical fiber connector of a type wherein a fiber block can move between forward and rearward positions, which greatly increases the force required to move the retainer block rearward during handling prior to mating, and which only slightly increases the force required to mate the connectors. This is accomplished by mounting a retainer on the connector housing, wherein the retainer has a latch that lies in the path of rearward movement of a shoulder on the fiber block, but the retainer also includes one lifter lying in the path of one of the guides of a mating connector device. This allows the lifter to be lifted by the guide during mating, to release the fiber block so it can be easily moved rearwardly at that time. The lifter is preferably formed of a piece of resilient sheet metal with one end such as the rear end mounted on the connector housing, and an opposite end portion such as the front end which forms a latch for retaining the fiber block and at least one lifter for enabling a guide to lift the lifter. A pair of spring arms connects the opposite ends of the retainer, the spring arms resiliently deflecting to allow the end with the latch and lifter to be lifted up.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber connector which includes a housing with a block receiving passage and a fiber block that is slideable in forward and rearward longitudinal directions in said passage, said housing having laterally opposite sides forming guide-receiving spaces for receiving guides of a mating connector device, wherein the fiber block must be in a forward position to mate to the mating connector device, and wherein the fiber block has a largely rearwardly-facing shoulder, including:

a retainer for retaining said fiber block in said forward position, said retainer including a latch that lies in the path of rearward movement of said shoulder of said fiber block to resist rearward movement of the fiber block from said forward position;

said retainer including at least one lifter lying in one of said guide-receiving spaces, to be lifted to a lifted position by one of said guides of the mating connector device during mating of said connector and mating connector device, said lifter being laterally spaced from said latch but being coupled to said latch to lift said latch only partially out of the way of rearward movement of said shoulder when said lifter is in said lifted position so when said lifter is in said lifted position said latch still remains in the path of rearward movement of said shoulder of said fiber block but the force required to move said fiber block shoulder rearwardly past said latch is reduced.

2. The connector described in claim 1 wherein:

said retainer includes two lifter parts, including said lifter, each lifter part lying in the path of a different one of said guides;

said retainer comprises a piece of sheet metal with a rear end mounted on said housing, a front end forming said latch and forming said lifters at positions that are laterally spaced from said latch, and a pair of spring arms extending between said rear and front ends, said spring arms bending to lift said front end and said latch when said lifters are deflected upward.

3. The connector described in claim 1 wherein:

said housing has a top wall with at least one lifter opening leading to the top of each of said guide-receiving spaces and with at least one latch opening leading to the path of said fiber block shoulder;

said retainer comprises a piece of sheet metal with a first retainer end fixed to said housing, a longitudinally spaced opposite second retainer end forming said latch and forming a pair of laterally-spaced lifters that each extends through said at least one lifter opening into a different one of said guide-receiving spaces and which is formed to be lifted by a corresponding one of said guides as it moves rearwardly along the space, said retainer forming a pair of laterally-spaced spring arms that each connects said first and second retainer ends.

4. An optical fiber connector which includes a housing with a block receiving passage and a fiber block that is slideable in forward and rearward longitudinal directions in said passage, said housing having laterally opposite sides that are spaced in lateral directions that are perpendicular to said longitudinal directions, said laterally opposite sides forming guide-receiving spaces lying beyond said passage for receiving guides of a mating connector device, wherein the fiber block must be in a forward position to mate to the mating connector device, and wherein the fiber block has a largely rearwardly-facing shoulder that moves in a path, and the housing has a top wall with a rear end portion having an edge including:

a resilient retainer element which includes a pair of lifters in the form of tabs that project into said guide-receiving spaces, to be lifted by said guides, and a latch in the form of a tab that lies laterally between said lifters and that lies in the path of said fiber block shoulder to resist rearward movement of the fiber block, said tab being coupled to said lifters so when said lifters are lifted by said guides said lifters lift said tab at least partially out of the path of said fiber block shoulder.

5. The connector described in claim 4 wherein:

said retainer element includes a rear end comprising a laterally extending rear strip with laterally opposite sides and with at least one tab that is bent around said edge of said housing top wall, said retainer element having a pair of spring arms extending forwardly from each of said strip end portions, and said element having a laterally-extending front strip with laterally opposite sides merging with front ends of said spring arms, said front strip forms said pair of lifters and said latch;

said spring arms each have a side tab that is bent downward, and said housing top wall has opposite sides that receive said side tabs in vertical sliding movement.

6. A retainer for mounting on the housing of an optical fiber connector to prevent a fiber block with a shoulder, from moving rearward until a pair of laterally opposite guides of a mating connector device are slid forwardly into said housing, comprising:

a resilient sheet metal element having a first end forming a mount for mounting on said housing, having a second end forming a latch that lies in the path of rearward movement of said fiber block, and having at least one resilient spring arm extending between said first and second ends to allow said second end to be lifted out of the path of said fiber block;

said second end forming a pair of laterally-spaced lifters lying in the path of said guides to be lifted by said guides, said lifters being spaced from said latch, and said lifters being coupled to said latch to deflect said latch to reduce the force required to move said latch out of a path of said shoulder.

* * * * *